United States Patent
Vaughn et al.

[11] Patent Number: 6,105,268
[45] Date of Patent: Aug. 22, 2000

[54] ADJUSTABLE MEASURING DEVICE

[76] Inventors: Michael E. Vaughn; Sherri L. Bauer, both of Rte. 7 Box 631-5, Joplin, Mo. 64801

[21] Appl. No.: 08/881,630

[22] Filed: Jun. 24, 1997

[51] Int. Cl.[7] ................ G01B 3/56; B43L 7/10
[52] U.S. Cl. .................. 33/471; 33/495; 33/534
[58] Field of Search ............. 33/1 N, 343, 418, 33/419, 421, 424–426, 452, 456, 458, 465, 471–473, 492, 495–500, 534, 538, 558.01, 558.4

[56] References Cited

U.S. PATENT DOCUMENTS

| | | |
|---|---|---|
| 330,799 | 11/1885 | Orendorff . |
| 407,285 | 7/1889 | Ensminger . |
| 532,001 | 1/1895 | Linden ................... 33/471 |
| 718,817 | 1/1903 | Caldwell et al. . |
| 792,469 | 6/1905 | Seibert ................... 33/499 |
| 840,628 | 1/1907 | Johnson .................. 33/471 |
| 1,585,563 | 5/1926 | Schlattau ................. 33/471 |
| 1,732,546 | 10/1929 | Tiedemann . |
| 2,651,844 | 9/1953 | Smith . |
| 2,661,034 | 12/1953 | MacDonald ............... 33/497 |
| 3,065,546 | 11/1962 | Brocklander ............. 33/425 |
| 3,191,309 | 6/1965 | Duchesneau . |
| 3,269,015 | 8/1966 | Barker ................... 33/495 |
| 3,431,653 | 3/1969 | Mudon . |
| 4,223,445 | 9/1980 | Goodland ................. 33/500 |
| 4,535,542 | 8/1985 | Liu et al. . |
| 4,562,649 | 1/1986 | Ciavarella ............... 33/497 |
| 4,729,173 | 3/1988 | Wilson . |
| 4,733,477 | 3/1988 | Fincham et al. . |
| 4,744,152 | 5/1988 | Roach et al. . |
| 4,779,354 | 10/1988 | Hill . |
| 4,955,141 | 9/1990 | Welch . |
| 5,187,877 | 2/1993 | Jory et al. . |
| 5,199,179 | 4/1993 | Baker .................... 33/481 |
| 5,440,818 | 8/1995 | Mailhot . |
| 5,461,794 | 10/1995 | Huang . |
| 5,539,991 | 7/1996 | Harrison . |

FOREIGN PATENT DOCUMENTS 110986  11/1917  United Kingdom .............. 33/464

OTHER PUBLICATIONS

Dearborn, "Anglet", patent document 866, Apr. 1808.

*Primary Examiner*—Andrew H. Hirshfeld
*Attorney, Agent, or Firm*—Welsh & Katz, Ltd.

[57] ABSTRACT

An adjustable measuring device, including two segments pivotally joined at one end and having a measuring arc therebetween, at least one of the segments having an extending member capable of extending across the pivotal joint. The measuring arc provides the measure of angle between the two segments. Inner corners can be measured by placing the two segments against the surfaces defining the inner corner and reading the measuring arc. By extending at least one of the extending members across the pivotal joint, the angle of outer corners can also be measured in a similar manner.

10 Claims, 3 Drawing Sheets

ADJUSTABLE MEASURING DEVICE

The present invention relates to a device for measuring angles, and more specifically, to a device having two segments, at least one of which has an extending member, pivotally joined and having a measuring arc therebetween. The device can be used to measure the angles of inner corners. By extending at least one of the extending members, the device can also be used to measure the angle of outer corners.

BACKGROUND OF THE INVENTION

There are many situations in which the angle between two surfaces needs to be measured. For instance, carpenters frequently need to measure angles between walls to determine whether the required specifications have been met. There are many different devices which can be used to measure the inner angle between two planar surfaces. Generally such devices consist of two pivotally joined arms which are joined by a protractor arc indicating the angle between the two arms. Various configurations applying this general principle are known in the art.

However, there are instances when the measure of the inner angle between two surfaces is either irrelevant, inaccessible, or less convenient. In situations where the outer angle is important, the above-mentioned devices have failed to provide a convenient and accurate tool. The prior art devices which are capable of measuring inner angles generally cannot be extended beyond 180 degrees because of the limited span of the measuring arc used. Therefore, two separate instruments have been required to measure both inner and outer angles.

Therefore, while devices capable of measuring inner angles are well known, there is a need for a single device which is capable of conveniently measuring both the inner and outer angles between two surfaces.

SUMMARY OF THE INVENTION

Accordingly, an object of the present invention is to provide an improved measuring device which can be used to measure angles generally.

A further object of the present invention is to provide a single measuring device which can be quickly and easily adjusted so that both inner and outer angles can be measured.

In accordance with the present invention, all of these objects, as well as others not herein specifically identified, are achieved generally by the present adjustable measuring device which includes two pivotally joined segments having a measuring arc therebetween, and at least one of the segments having an extending member.

More specifically, the present embodiment of the invention includes two segments having substantially straight outer edges. The two segments are pivotally joined at one end. Between the two segments is a measuring arc defined by two arc sections. An arc section is secured to each segment, and the arc sections operationally connected are in sliding engagement with each other so that the segments can be rotated about the pivotal joint to the extent allowed by the span of the two arc sections. At least one of the segments has an extending member which is capable of extending across the pivotal joint. Outer angles can be measured by placing the extending member against one surface, while placing the outer edge of the non-extended segment against the other surface. Additionally, extending members can be provided on both segments. The extending members can be appropriately extended when measuring outer angles to suit the particular corner being measured. The range of inner and outer angles which can be measured is from angles substantially less than 90 degrees to angles substantially greater than 90 degrees, and is determined by the span of the measuring arc and its two arc sections.

BRIEF DESCRIPTION OF THE DRAWINGS

Further objects of the invention, taken together with additional features contributing thereto and advantages occurring therefrom, will be apparent from the following description when read in conjunction with the accompanying drawings, wherein.

DETAILED DESCRIPTION OF THE INVENTION

Figure 1:
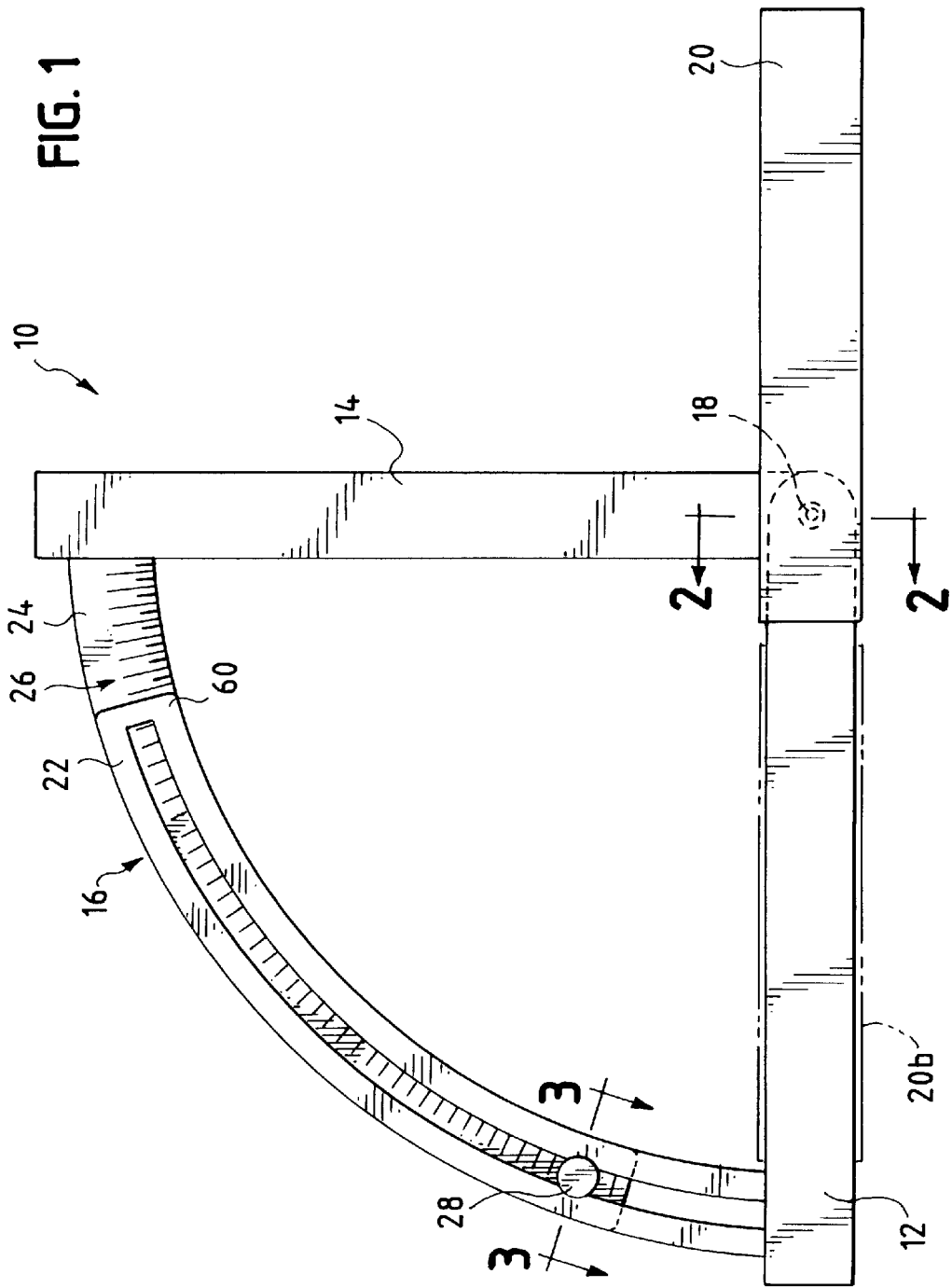
FIG. 1 is a side planar view of one embodiment of the present invention.

Referring to FIG. 1, the adjustable measuring device is generally designated as item 10. The measuring device 10 includes a first segment 12, a second segment 14, and a measuring arc 16. The first and second segments 12, 14 are pivotally joined at the pivotal joint 18. The ends of the first and second segments 12, 14 near the pivotal joint 18 are round so that the outer edges of the segments 12, 14 can be placed against the surfaces being measured regardless of the angle between the segments 12, 14.

As shown in FIG. 1, the first segment 12 is provided with a first extending member 20 which extends from and parallel to the first segment 12. The retracted position of the first extending member 20 is drawn in shadow 20b.

The measuring arc 16 is defined by a first arc section 22 and a second arc section 24. The first arc section 22 is joined to the first segment 12 and is provided with a slot along most of its length. The second arc section 24 is joined to the second segment 14 and is positioned to overlap and be operationally connected with the first arc section 22. The second arc section 24 is provided with measurement markings 26 which indicate the angle between the first and second segments 12, 14. The markings 26 can be calibrated to be read from the free end 60 of the first arc section 22.

Figure 2:
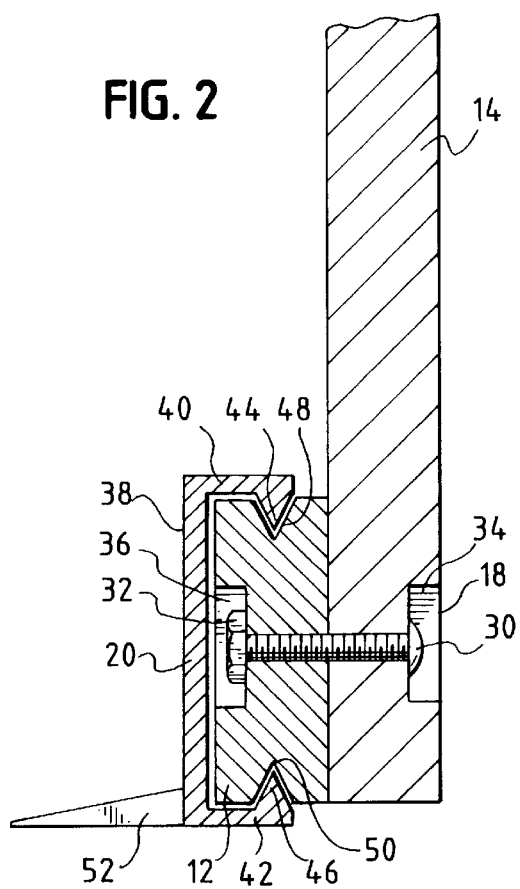
FIG. 2 is a sectional view of the device as depicted in FIG. 1 along the line A—A.

Referring now to FIG. 2, the structure near the pivotal joint 18 is shown in more detail. The two segments 12, 14 are joined at the pivotal joint 18 by a screw 30 which engages a nut 32. Both the screw 30 and the nut 32 are placed in recesses 34, 36, respectively, to prevent interference with the first extending member 20. The first extending member 20 has a face 38 from which outer skirts 40, 42 depend. The outer skirts 40, 42 are provided with ridges 44, 46. The ridges 44, 46 fit into corresponding grooves 48, 50 which run along a portion of the length of the first segment 12. The extending member 20 is thereby in sliding engagement with the first segment 12 and can be extended, as shown in FIG. 1. There are, of course, many alternative ways to engage the first extending member 20 with the first segment 12. Various configurations for engaging the first extending member 20 with the first segment 12 can be utilized without departing from the teachings of the present invention.

Also shown in FIG. 2 is a lip 52 which can be secured to the first extending member 20. The lip 52 can extend along the entire length of the first extending member 20 or just a portion thereof. Depending on the configuration of the first extending member 20, the lip 52 may instead be secured onto the first segment 12 itself. The lower surface of the lip 52 is perpendicular to the length of the second segment 14 from the perspective shown in FIG. 2. The lip 52 thereby provides a convenient means for perpendicular positioning of the second segment 14, relative to the surface on which the first segment 12 is placed.

Figure 3:
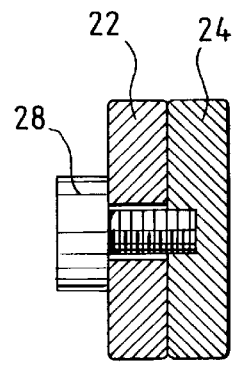
FIG. 3 is a sectional view of the device as depicted in FIG. 1 along the line B—B.

FIG. 3 is a more detailed sectional view of the engagement of the two arc sections 22, 24 by the thumb screw 28. As can be seen in FIG. 3, the first arc section 22 lies on top of the second arc section 24 and is secured thereto by the thumb screw 28. During adjustment of the angle, the thumb screw 28 is not firmly tightened so that the two arc sections 22, 24 can slide freely. Once the desired angle is found, the thumb screw 28 may be tightened firmly so that the angle between the two segments 12, 14 is secured and the device 10 can be used as a template, if desired.

Figure 4:
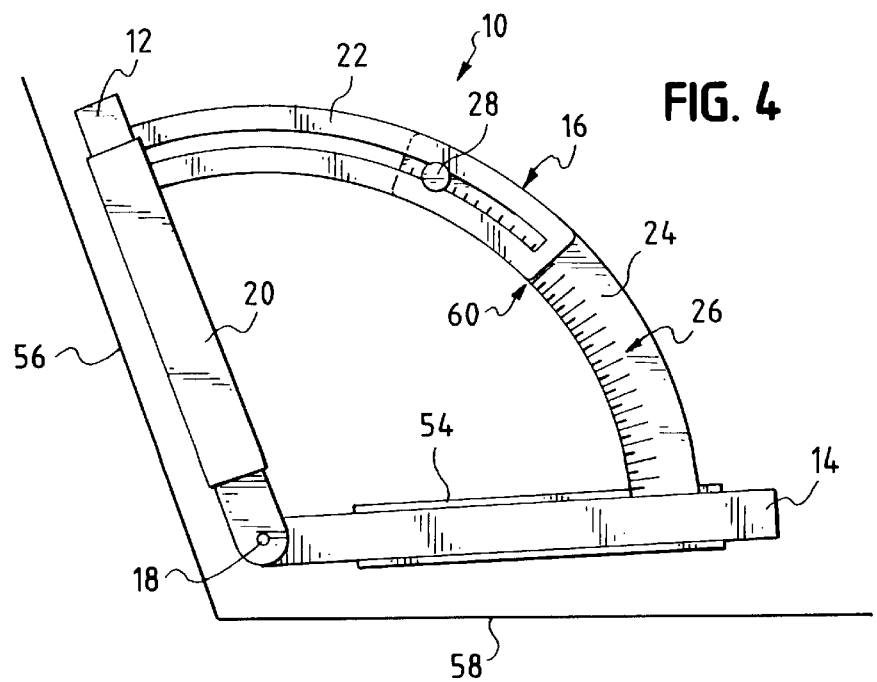
FIG. 4 is a side planar view of another embodiment of the present invention near an inner angle.

Referring now to FIG. 4, another embodiment of the present invention is shown. In this embodiment, the measuring device 10 is provided with a second extending member 54 on the second segment 14. The device 10 is shown near an inner corner defined by a first surface 56 which intersects with a second surface 58. With the extending members 20, 54 retracted, the device 10 is used to measure the inner corner by placing the first and second segments 12, 14 against the first and second surfaces 56, 58. The measure of the angle is determined by viewing the measurement markings 26 at the free end 60 of the first arc section 22.

Figure 5:
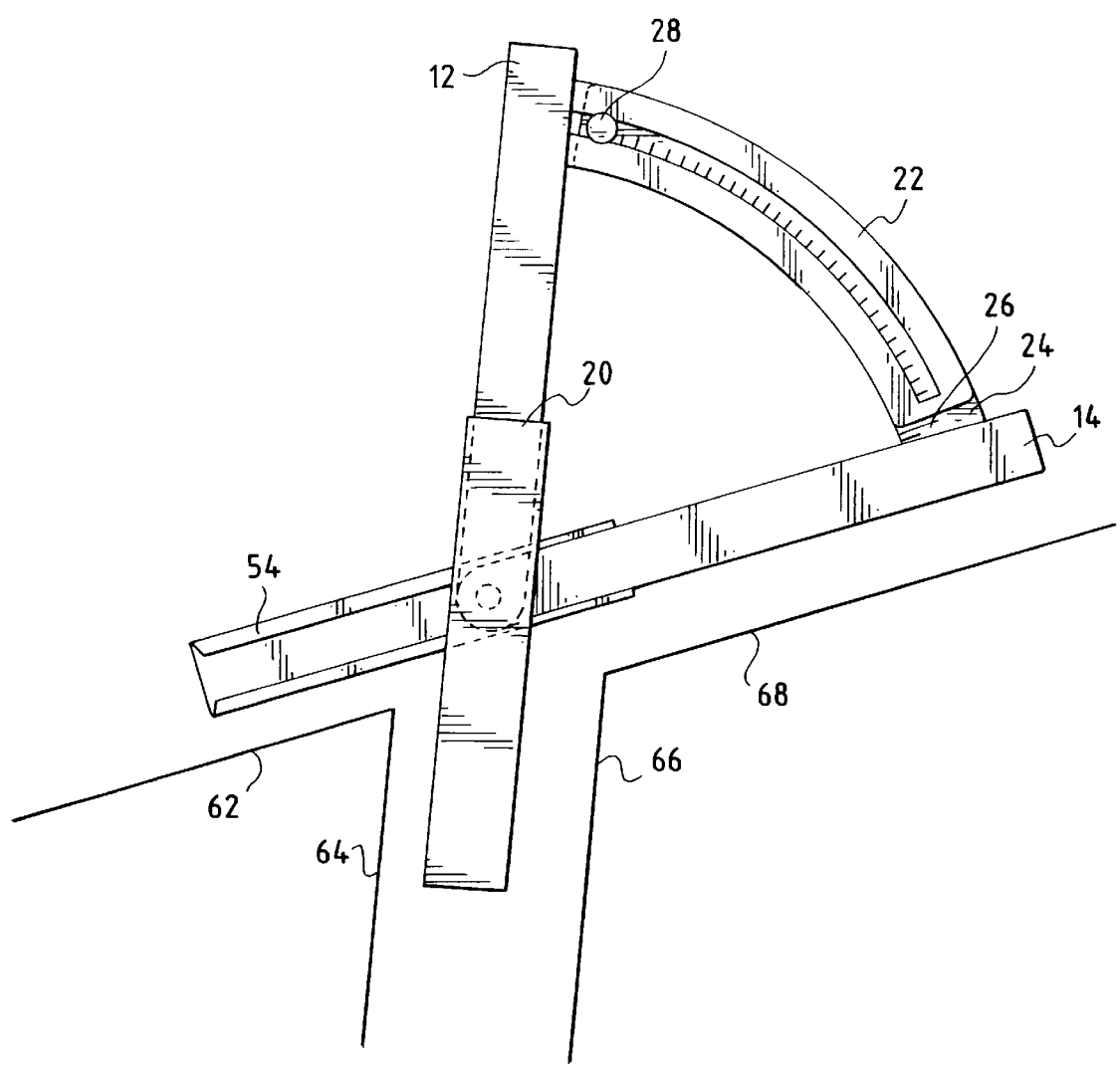
FIG. 5 is a side planar view of an embodiment of the present invention near two outer angles.

Referring now to FIG. 5, the device 10 of the present invention can be used to measure outer corners by utilizing the first and second extending members 20, 54. For instance, the outer corner defined by the intersecting surfaces 62 and 64 that are illustrated as obliquely intersecting one another to define an interior angle of about 68 degrees can be measured by extending both extending members 20, 54. The extending members 20, 54 are placed against the two surfaces 62, 64 and the angle illustrated as about 68 degrees is determined by reading the measurement markings 26. The outer corner angle defined by the surfaces 66 and 68 which is illustrated as the supplemental angle of about 180 degrees less 68 degrees, or 112 degrees, can also be measured with the present device 10. When measuring the angle between these surfaces 66, 68, it is only necessary to extend the first extending member 20, and it does not matter whether the second extending member 54 is extended or retracted. The measure of the angle outer corner between surfaces 66 and 68 illustrated as being about 112 degrees, is determined by adding the angle indicated by the measurement marking 26 to 180 degrees, since the first segment 12 is in line and parallel with the first extending member 20. Accordingly, the present invention provides a new and convenient device which can be utilized to measure both inner and outer corners that may be substantially less than ninety degrees (e.g. 68 degrees), or substantially more than ninety degrees (e.g. 112 degrees).

While particular embodiments of the present invention have been shown and described, it will be appreciated by those skilled in the art that changes and modifications may be made thereto without departing from the invention in its broader aspects and as set forth in the following claims.

What is claimed is:

1. An adjustable angle measuring device capable of measuring a range of both inner and outer angles of an object having at least first and second substantially non-coplanar surfaces, the device comprising, in combination:

a first segment having a substantially straight outer edge engageable along at least part of its length with at least one of said first and second non-coplanar surfaces, said first segment having a pivotal end;

a second segment having a substantially straight outer edge engageable along at least part of its length with at least the other of said first and second non-coplanar surfaces, said second segment having a pivotal end;

said first and second segments pivotally joined at said pivotal ends of said first and second segments;

a measuring arc extending between said first and second segments, said measuring arc comprising first and second arc sections operationally connected to measure an angle, between said first and second segments in a range from less than ninety degrees to more than ninety degrees said first arc section having a first end attached to said first segment and a second end positioned between the segments, said second arc section having a first end attached to said second segment and a second end positioned between the segments, said first and second arc sections being in sliding engagement with each other, and each arc section being an angular segment of substantially less than ninety degrees; and an extending member operatively coupled to said first segment, said extending member being extendably parallel to said first segment across said pivotal end of said first segment.

2. The adjustable angle measuring device as defined in claim 1, wherein said pivotal ends of said first and second segments are rounded.

3. The adjustable angle measuring device as defined in claim 1 further comprising a lip having a lower surface, said lip secured to said first segment, said lower surface of said lip aligned with said outer edge of said first segment, and said lower surface being substantially perpendicular to a plane defined by said first and second segments.

4. The adjustable angle measuring device as defined in claim 1, wherein said first arc section has a slot along a portion of its length, and a screw secured through said slot and onto said second arc section, thereby maintaining sliding engagement between said first and second arc sections.

5. The adjustable angle measuring device as defined in claim 4, wherein said screw can be adjusted to firmly secure said first and second arc sections together such that there is no sliding therebetween, thereby fixedly securing the relative positions of said first and second segments.

6. The device of claim 1 further comprising:

second extending member operatively coupled to said second segment, said second extending member being extendably parallel to said second segment and across said pivotal end of said second segment.

7. The adjustable angle measuring device as defined in claim 6, wherein said pivotal ends of said first and second segments are rounded.

8. The adjustable angle measuring device as defined in claim 6, further comprising a lip having a lower surface, said lip secured to said first segment, said lower surface of said lip aligned with said outer edge of said first segment, and said lower surface being substantially perpendicular to a plane defined by said first and second segments.

9. The adjustable angle measuring device as defined in claim 6, wherein said first arc section has a slot along a portion of its length, and a screw secured through said slot and onto said second arc section, thereby maintaining sliding engagement between said first and second arc sections.

10. The adjustable angle measuring device as defined in claim 9, wherein said screw can be adjusted to firmly secure said first and second arc sections together such that there is no sliding therebetween, thereby fixedly securing the relative positions of said first and second segments.

* * * * *